United States Patent
Ono et al.

(10) Patent No.: US 7,348,065 B2
(45) Date of Patent: Mar. 25, 2008

(54) SLIPPING PROPERTY IMPARTING AGENT FOR CLEAR COATING AND CLEAR COATING PAPER HAVING THE AGENT APPLIED THEREON

(75) Inventors: Hiroshi Ono, Tokyo (JP); Fuminari Nonomura, Tokyo (JP); Hideki Fujiwara, Tokyo (JP); Tsutomu Miyata, Kyoto (JP); Yoshinobu Nakano, Kyoto (JP)

(73) Assignees: Nippon Paper Industries Co., Ltd., Tokyo (JP); San Nipco Limited, Kyoto (JP)

( * ) Notice: Subject to any disclaimer, the term of this patent is extended or adjusted under 35 U.S.C. 154(b) by 0 days.

(21) Appl. No.: 10/509,226

(22) PCT Filed: Mar. 26, 2003

(86) PCT No.: PCT/JP03/03719

§ 371 (c)(1),
(2), (4) Date: Apr. 14, 2005

(87) PCT Pub. No.: WO03/080930

PCT Pub. Date: Oct. 2, 2003

(65) Prior Publication Data
US 2005/0176908 A1    Aug. 11, 2005

(30) Foreign Application Priority Data
Mar. 27, 2002    (JP) .............................. 2002-087341

(51) Int. Cl.
*B32B 23/08*    (2006.01)

(52) U.S. Cl. ...................................................... 428/514

(58) Field of Classification Search .................. 428/514
See application file for complete search history.

(56) References Cited

U.S. PATENT DOCUMENTS 5,995,785 A * 11/1999 Kato et al. ................... 399/127
6,120,655 A *  9/2000 Ishii et al. ................... 204/164

FOREIGN PATENT DOCUMENTS

| JP | 5104330 A | * | 4/1976 |
| JP | 5405031 A | * | 4/1979 |
| JP | 55040835 A | * | 3/1980 |
| JP | 59174850 | * | 10/1984 |
| JP | 2-308242 | | 12/1990 |
| JP | 3-137295 | | 6/1991 |
| JP | 4-057998 | | 2/1992 |
| JP | 4-153239 | | 5/1992 |
| JP | 8-62777 | | 3/1996 |
| JP | 10298295 A | * | 11/1998 |
| JP | 2003183453 | * | 7/2003 |

* cited by examiner

*Primary Examiner*—Kevin R. Kruer
(74) *Attorney, Agent, or Firm*—Knobbe, Martens, Olson & Bear LLP

(57) ABSTRACT

Produce a slipping property imparting agent for clear coat that reduces scum production: wherein, (1) the agent comprises a copolymer whose constituents are unsaturated olefin (constituent (a)) and unsaturated carboxylic acid (carboxylate) (constituent (b)); (2) constituent (a) accounts for 50 to 99 mol percent and constituent (b) accounts for 50 to 1 mol percent, respectively, of the total mol number of constituents (a) and (b) combined; and (3) a constituent (c) that can be polymerized with the constituents (a) and (b) is contained, as necessary, by up to 20 mol percent of the total mol number of constituents (a) and (b) combined.

15 Claims, No Drawings

SLIPPING PROPERTY IMPARTING AGENT FOR CLEAR COATING AND CLEAR COATING PAPER HAVING THE AGENT APPLIED THEREON

This application is the U.S. National Phase under 35 U.S.C. §371 of International Application PCT/JP03/03719, filed on Mar. 26, 2003, which claims priority of Japanese Patent Application No. 2002-87341, filed on Mar. 27, 2002. The International Application was published under PCT Article 21(2) in a language other than English.

FIELD OF THE INVENTION

This invention relates to a slipping property imparting agent for clear coat and a clear coated paper processed therewith.

To be specific, this invention relates to a slipping property imparting agent for clear coat that can gradually reduce the friction coefficient of a printing paper when applied over the paper surface in a sizing press or calender or using a spray applicator, as well as a coated paper processed with said slipping property imparting agent.

BACKGROUND OF THE INVENTION

A number of slipping property imparting agents for coating are presently known, including higher fatty-acid metal salt, higher fatty-acid amide, wax emulsion, polyethylene glycol, polyethylene glycol ester, liquid hydrocarbon oil emulsion, polyethylene dispersion and sulfurized fatty oil (Japanese Patent Application Laid-open No. 3-137295 and Japanese Patent Application Laid-open No. 58-8200). These slipping property imparting agents can be used in pigment coating materials of pH7 or higher that contain calcium carbonate. However, in clear coating materials of lower than pH7 whose main constituent is starch, these slipping property imparting agents have heretofore failed to satisfy the required slippage for clear coat, because they produce an agglutinated product called scum if the dispersion stability drops and a shearing load is applied during the coating process.

Against the backdrop of increasing use of recycled paper in paper production, the market is witnessing lower blending ratios of mechanical pulps or extracts from mechanical pulps. In addition, calcium carbonate fillers are being used to produce papers having a neutral pH level. As a result, the friction coefficient of printing paper is increasing in general. A higher friction coefficient of printing paper can lead to wrinkling or other problems during web offset printing that affect a smooth traveling of paper through the cylinders. Therefore, it is important to adjust the friction coefficient of paper to an optimal level in accordance with the specific operation of each printing plant.

To reduce the friction coefficient of paper, alkylketene dimer (AKD) or talc can be added to the material during the paper production process, or a slipping property imparting agent for pigment coat can be coated on the produced paper. If AKD is added to the paper material, in summertime AKD may migrate on the take-up roller, thereby causing the friction coefficient to decrease significantly on the top roller and consequently allowing the paper to slip during printing. When talc is added to the paper material, the blending ratios of white carbon filler, calcium carbonate filler or other fillers having a high specific scattering coefficient must be reduced, which inevitably reduces the opacity of paper. Therefore, these methods are not suitable in the production of high-quality papers. In addition, applying a clear pigment coat containing slipping property imparting agents can produce an agglutinated product called scum, if the dispersion stability drops and a shearing load is applied during the coating process, which can cause a major problem on the printing line.

The aim of the present invention is to provide a slipping property imparting agent for clear coat that reduces scum production even when the dispersion stability drops and a shearing load is applied during the coating process.

SUMMARY OF THE INVENTION

The inventors have carried out extensive studies in order to solve the aforementioned problems by way of providing a new slipping property imparting agent for clear coat that reduces scum production, and have found that a slipping property imparting agent for clear coat that contains a copolymer whose constituents are unsaturated olefin and unsaturated carboxylic acid (carboxylate) and/or a neutralized salt of their carboxyl groups will produce no scum, and that this slipping property imparting agent will gradually reduce the dynamic friction coefficient of a base printing paper and therefore will not affect printability when coated on the paper to a coating weight of 0.001 to 1 g/m$^2$ by solid content.

In other words, the present invention is basically characterized as follows:

(1) A slipping property imparting agent for clear coat which comprises a copolymer whose constituents are unsaturated olefin and unsaturated carboxylic acid (carboxylate).
(2) A slipping property imparting agent for clear coat as described in (1) above, wherein the aforementioned copolymer comprising unsaturated olefin (constituent (a)) and unsaturated carboxylic acid (carboxylate) (constituent (b)) contains 50 to 99 mol percent of constituent (a) and 50 to 1 mol percent of constituent (b) to the total mol number of constituents (a) and (b) combined.
(3) A slipping property imparting agent for clear coat as described in (1) or (2) above, wherein the aforementioned copolymer contains a constituent (constituent (c)) that can be copolymerized with the aforementioned unsaturated olefin (constituent (a)) and unsaturated carboxylic acid (carboxylate) (constituent (b)), by up to 20 mol percent of the total mol number of constituents (a) and (b) combined.
(4) A slipping property imparting agent for clear coat as described in any of (1) though (3) above, wherein the aforementioned copolymer contains 0.05 to 3 mol equivalent of alkalis per 1 mol equivalent of carboxyl groups.
(5) A slipping property imparting agent for clear coat as described in any of (1) though (4) above, wherein the cumulative average particle size of the aforementioned copolymer is 1 to 50,000 nm.
(6) A clear coated paper coated with 0.001 to 1 g/m$^2$ by solid content of the slipping property imparting agent for clear coat as described in any of (1) though (5) above.

BEST MODE FOR CARRYING OUT THE INVENTION

The copolymer proposed by the present invention for use in a slipping property imparting agent for clear coat that reduces scum production, is a copolymer containing unsaturated olefin (constituent (a)) and unsaturated carboxylic acid (carboxylate) (constituent (b)).

Examples of the unsaturated olefin (constituent (a)) that constitutes the copolymer used in the present invention may be any one or more of the following: olefin derivatives such as ethylene, propene, cyclopropene, 1-fluoropropene, 2-fluoropropene, 3-fluoropropene, 1,1,1-trifluoropropene, hexafluoropropene, aryl alcohol, 1-butene, 2-butene, isobutene, cyclobutene, methylene cyclopropane, hexafluorocyclobutene, 1-pentene, 2-pentene, 2-methyl-1-butene, 3-methyl-1-butene, 2-methyl-2-butene, cyclopentene, 1-methyl-cyclobutene, 3-methyl-cyclobutene, methylene cyclobutane, vinyl cyclopropane, 1-fluorocyclopentene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-ethyl-1-butene, 2,3-dimethyl-1-butene, 3,3-dimethyl-1-butene, 2,3-dimethyl-2-butene, 3,3-dimethyl-1-butene, 2,3-dimethyl-2-butene, cyclohexene, 1-methyl cyclopentene, 3-methyl cyclopentene, 4-methyl cyclopentene, methylene cyclopentane, isopropenyl cyclopropane, 1-fluorocyclohexene, 1-heptene, 2-heptene, 3-heptene, 2-methyl-1-hexene, 3-methyl-1-hexene, 4-methyl-1-hexene, 5-methyl-1-hexene, 2-methyl-2-hexene, 3-methyl-2-hexene, 4-methyl-2-hexene, 5-methyl-2-hexene, 2-methyl-3-hexene, 2,3-dimethyl-1-pentene, 2,4-dimethyl-1-pentene, 3,3-dimethyl-1-pentene, 3,4-dimethyl-1-pentene, 4,4-dimethyl-1-pentene, 2,3-dimethyl-2-pentene, 2,4-dimethyl-2-pentene, 3,3-dimethyl-2-pentene, 3,4-dimethyl-2-pentene, 4,4-dimethyl-2-pentene, cycloheptene, 1-methyl cyclohexene, 3-methyl cyclohexene, methylene cyclohexane, 2-cyclopropyl-1-butene, 2-cyclopropyl-2-butene, 1-fluorocycloheptene, 1-octene, 2-octene, 3-octene, 4-octene, 2-methyl-1-heptene, 6-methyl-1-heptene, 3-methyl-2-heptene, 4-methyl-2-heptene, 2,3-dimethyl-2-hexene, 2,3,3-trimethyl-1-pentene, 2,4,4-trimethyl-1-pentene, 2,3,4-trimethyl-2-pentene, 2,4,4-trimethyl-2-pentene, 3,4,4-trimethyl-2-pentene, cyclooctene, 1-methyl cycloheptene, 5-methyl cycloheptene, 1,1-dimethyl cyclohexene, 1,2-dimethyl cyclohexene, 1,3-dimethyl cyclohexene, 1,4-dimethyl cyclohexene, 1,5-dimethyl cyclohexene, 3,5-dimethyl cyclohexene, 3,6-dimethyl cyclohexene, 1,2,3-trimethyl cyclopentene, vinyl cyclohexane, 2-cyclopropyl-1-pentene, 2-cyclopropyl-2-pentene, 2-cyclopropyl-3-methyl-1-butene, 1,1,1-trifluoro-2-octene, 1-nonene, 2-nonene, 3-nonene, 4-nonene, 2,6-dimethyl-2-heptene, 2,2,5-trimethyl-3-hexene, 2,4,5-trimethyl-2-hexene, 1,2,3-trimethyl cyclohexene, 1,3,5-trimethyl cyclohexene, 1,4,4-trimethyl cyclohexene, 1,4,5-trimethyl cyclohexene, 1,5,5-trimethyl cyclohexene, 1,5,6-trimethyl cyclohexene, 1,6,6-trimethyl cyclohexene, 2-methylvinyl cyclohexane, 3-methylvinyl cyclohexane, 4-methylvinyl cyclohexane, 2-cyclopropyl-1-hexene, 2-cyclopropyl-2-hexene, 3-phenyl-1-propene, 1-decene, 2-decene, 4-decene, 5-decene, 1,4,4-trimethyl cycloheptene, 1-isopropyl-2-methyl cyclohexene, 1-isopropyl-4-methyl cyclohexene, 1-isopropyl-5-methyl cyclohexene, 4-isopropyl-1-methyl cyclohexene, 5-isopropyl-3-methyl cyclohexene, 1-isopropenyl-4-methyl cyclohexane, α-pinene, β-pinene, 4-phenyl-1-butene, 5-phenyl-1-butene, 1-dodecene, 3-phenyl-1-pentene, 5-phenyl-1-pentene, 1-phenyl-2-pentene, 5-phenyl-2-pentene, 6-phenyl-1-hexene, 1-phenyl-2-hexene, 1-phenyl-3-hexene, 2-phenyl-3-hexene, 1-phenyl cyclohexene, 3-phenyl cyclohexene, 4-phenyl cyclohexene, norbornene and 5-methyl norbornene; styrene derivatives such as styrene, α-methyl styrene, chlorostyrene, cyanostyrene, aminostyrene and hydroxystyrene; and diene derivatives such as butadiene, isoprene and allene. Of these, ethylene and styrene provide a suitable unsaturated olefin for the purpose of the present invention.

The unsaturated carboxylic acid (carboxylate) (constituent (b)) that constitutes the copolymer used in the present invention may be any one or more of the following: acrylic acid derivatives such as acrylic acid, acrolein, crotonic acid, isocrotonic acid, 2-ethyl acrylic acid, 3,3-dimethyl acrylic acid, 3-propyl acrylic acid, 3-isopropyl acrylic acid, 2-isopropyl acrylic acid, trimethyl acrylic acid, 3-butyl acrylic acid, 2-butyl acrylic acid, 2-methyl-2-hexenoic acid, 3-methyl-3-propyl acrylic acid, 2,3-diethyl acrylic acid, 4-methyl-2 hexanoic acid, 3,3-diethyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, 2-octenoic acid, 2-pentyl acrylic acid, 2-butyl crotonic acid, 2-ethyl-3-propypl acrylic acid, 4-ethyl-2-hexenoic acid, 2-methyl-3,3-diethyl acrylic acid, 2-nonenoic acid, 2-hexyl acrylic acid, 2-methyl-3-pentyl acrylic acid, 3-methyl-3-pentyl acrylic acid, 3,3-dipropyl acrylic acid, 3-methyl-2-ethyl-2-hexenoic acid, 2-decenoic acid, 3-methyl-3-hexyl acrylic acid, nonene-4-carboxylic acid and 4-ethyl-2-octenoic acid; methacrylic acid derivatives such as methacrylic acid, methacrolein, methacryl isocyanate, methacryl isothiocyanate and methacryl fluoride; maleic anhydride derivatives such as maleic anhydride, methyl maleic anhydride, dimethyl maleic anhydride, phenyl maleic anhydride and fluoro maleic anhydride; maleic acid derivatives such as maleic acid, methyl maleic acid, dimethyl maleic acid, phenyl maleic acid, fluoro maleic acid; monohydroxyl compounds of maleic acid/maleic anhydride and methanol, ethanol, propanol, butanol, hexanol, octanol, dodecanol or octadecanol; partial esterified compounds such as ethylcellosolve and butylcellosolve; dicarboxylic acids such as oxalic acid, malonic acid, succinic acid, itaconic acid, fumaric acid, glutaric acid, adipic acid, galactaric acid, pimelic acid, suberic acid, azelaic acid, sebacic acid, undecanoic diacid, dodecanoic diacid, tridecanoic diacid, tetradecanoic diacid, pentadecanoic diacid, hexadecanoic diacid, heptadecanoic diacid, octadecanoic diacid, nonadecanoic diacid, eicosanoic diacid, docosanoic diacid, phthalic acid, isophthalic acid and telephthalic acid; and partially or completely neutralized salts thereof. Of these, acrylic acid, methacrylic acid, maleic acid and maleic anhydride or their partially or completely neutralized salts provide a suitable unsaturated carboxylic acid (carboxylate) for the purpose of the present invention.

The content of unsaturated olefin (constituent (a)) in the copolymer should be normally 50 to 99 mol percent, or preferably 60 to 98 percent, or at best 70 to 97 mol percent. If the content of unsaturated olefin in the copolymer is less than 50 mol percent, the manifested slippage will decrease. On the other hand, if the content of unsaturated olefin in the copolymer exceeds 99 mol percent, the mechanical stability of the slipping property imparting agent will decrease and therefore an agglutinated product called scum will be produced if a shearing load is applied during the coating process, which can cause a major problem on the printing line. This is not desirable.

The content of unsaturated carboxylic acid (carboxylate) (constituent (b)) in the copolymer that provides the slipping property imparting agent proposed by the present invention should be normally 1 to 50 mol percent, or preferably 2 to 40 percent, or at best 3 to 30 mol percent. If the content of unsaturated carboxylic acid (carboxylate) in the copolymer is less than 1 mol percent, and the pH value of the coating material is less than 7, the dispersion stability of the slipping property imparting agent in the coating material will decrease, and the mechanical stability will also drop. As a result, an agglutinated product called scum will be produced if a shearing load is applied during the coating process, which can cause a major problem on the printing line. This is not desirable. On the other hand, if the content of unsaturated carboxylic acid (carboxylate) in the copolymer exceeds 50 mol percent, the manifested slippage will decrease and the tackiness will increase, which is also not desirable.

In other words, in the copolymer containing unsaturated olefin (constituent (a)) and unsaturated carboxylic acid (carboxylate) (constituent (b)), it is preferable to adjust the content of constituent (a) to 50 to 99 mol percent and that of constituent (b) to 50 to 1 mol percent relative to the total mol number of constituents (a) and (b) combined, from the viewpoint of increasing the manifested slippage, improving the mechanical stability and reducing the tackiness.

The copolymer may contain a constituent that can be copolymerized with the aforementioned unsaturated olefin (constituent (a)) and unsaturated carboxylic acid (carboxylate) (constituent (b)). This constituent is referred to as constituent (c). Constituent (c) may be any one or more of the following: vinyl esters such as vinyl acetate and vinyl propionate; unsaturated alkyl ester carboxylates such as methyl ester acrylate, ethyl ester acrylate, propyl ester acrylate, butyl ester acrylate, isooctyl ester acrylate, 2-ethylhexyl ester acrylate, methyl ester methacrylate, ethyl ester methacrylate, propyl ester methacrylate, butyl ester methacrylate, isooctyl ester methacrylate, 2-ethylhexyl ester acrylate, dimethyl ester maleate and diethyl ester maleate; polyoxyalkylenes such as polyoxyethylene (ethylene oxide added by 2 to 100 in mols) monoester acrylate, polyoxyethylene propylene (alkylene oxide added by 2 to 100 mols) monoester acrylate, polyoxyethylene propylene (propylene oxide added by 2 to 100 mols) monoester acrylate, polyoxyethylene (ethylene oxide added by 2 to 100 mols) monoester methacrylate, polyoxyethylene propylene (alkylene oxide added by 2 to 100 mols) monoester methacrylate, and polyoxyethylene propylene (propylene oxide added by 2 to 100 mols) monoester methacrylate; alkoxypolyalkylene glycol ester acrylates such as methoxypolyalkylene glycol (alkylene oxide added by 2 to 100 mols) ester acrylate, ethoxypolyalkylene glycol (alkylene oxide added by 2 to 100 mols) ester acrylate, propoxypolyalkylene glycol (alkylene oxide added by 2 to 100 mols) ester acrylate, butoxypolyalkylene glycol (alkylene oxide added by 2 to 100 mols) ester acrylate, methoxypolyalkylene glycol (alkylene oxide added by 2 to 100 mols) ester methacrylate, ethoxypolyalkylene glycol (alkylene oxide added by 2 to 100 mols) ester methacrylate, propoxypolyalkylene glycol (alkylene oxide added by 2 to 100 mols) ester methacrylate and butoxypolyalkylene glycol (alkylene oxide added by 2 to 100 mols) ester methacrylate; polyoxyalkylene monovinyl ethers such as polyoxyethylene (ethylene oxide added by 2 to 100 mols) monovinyl ether, polyoxyethylene propylene (alkylene oxide added by 2 to 100 mols) monovinyl ether, and polyoxypropylene (propylene oxide added by 2 to 100 mols) monovinyl ether; alkoxyalkylene glycol monovinyl ethers such as etoxypolyalkylene glycol (alkylene oxide added by 2 to 100 mols) monovinyl ether, propoxypolyalkylene glycol (alkylene oxide added by 2 to 100 mols) monovinyl ether and butoxypolyalkylene glycol (alkylene oxide added by 2 to 100 mols) monovinyl ether; polyoxyalkylene aryl ethers such as polyoxyethylene (ethylene oxide added by 2 to 100 mols) aryl ether, polyoxyethylene propylene (alkylene oxide added by 2 to 100 mols) aryl ether and polyoxypropylene (propylene oxide added by 2 to 100 mols) aryl ether; alcoxypolyalkylene glycol aryl ethers such as methoxypolyalkylene glycol (alkylene oxide added by 2 to 100 mols) aryl ether, ethoxyalkylene glycol (alkylene oxide added by 2 to 100 mols) aryl ether, propoxypolyalkylene glycol (alkylene oxide added by 2 to 100 mols) aryl ether and butoxypolyalkylene glycol (alkylene oxide added by 2 to 100 mols) aryl ether; hydroxyl alkyl acrylates such as hydroxymethyl acrylate, hydroxyethyl acrylate, hydroxypropyl acrylate, hydroxybutyl acrylate, hydroxymethyl methacrylate, hydroxyethyl methacrylate, hydroxypropyl methacrylate and hydroxybutyl methacrylate; amide compounds such as acrylamide, N',N'-dimethyl acrylamide, N-alkanol acrylamide, methacrylamide and N-alkanol methacrylamide; and dimethyl aminomethyl acrylate, dimethyl aminoethyl acrylate, diethyl aminomethyl acrylate, diethyl aminoethyl acrylate, dimethyl aminomethyl methacrylate, dimethyl aminoethyl methacrylate, diethyl aminomethyl methacrylate, diethyl aminoethyl methacrylate, vinyl chloride, benzil acrylate, benzil methacrylate, styrene sulfonate, vinyl sulfonate, 2-acrylamide-2-methylpropane sulfonate and vinyl pyridine.

Constituent (c) in the copolymer may account for up to 20 mol percent of the total mol number of constituents (a) and (b) combined. If the content of constituent (c) in the copolymer exceeds 20 mol percent, the manifested slippage will decrease or the mechanical stability of the slipping property imparting agent will drop. As a result, an agglutinated product called scum will be produced if a shearing load is applied during the coating process, which can cause a major problem on the printing line. This is not desirable.

The copolymer used in the present invention can be obtained by copolymerizing the constituent unsaturated polyolefin (a), constituent unsaturated carboxylic acid (carboxylate) (b) and constituent (c) using the high-pressure radical polymerization method, radical polymerization method or other known polymerization methods (U.S. Pat. No. 3,239,370, U.S. Pat. No. 3,520,861, Canada Patent No. 655298, U.S. Pat. No. 3,658,741, U.S. Pat. No. 3,884,857, U.S. Pat. No. 3,988,509, U.S. Pat. No. 4,248,990, U.S. Pat. No. 4,252,924, etc.)

The present invention allows for addition of alkalis to the slipping property imparting agent for clear coat. At this time, the copolymer may be a neutralized salt comprising partially or completely neutralized carboxyl groups.

The content of alkalis should be normally 0.05 to 3 mol equivalent, or preferably 0.2 to 2 mol equivalent, or at best 0.3 to 1.5 mol equivalent per 1 mol equivalent of carboxyl groups in the copolymer. If the content of alkalis is less than 0.05 mol equivalent, a favorable water-based dispersion cannot be obtained. On the other hand, if the content of alkalis exceeds 3 mol equivalent, a favorable water-based dispersion cannot be obtained due to gelatinization, and also the printing paper coated with said water-based dispersion will have a lower water resistance. This is not desirable.

Examples of alkalis that can be used to neutralize the copolymer include the following: ammonia; amine compounds such as alkylamines (monoethylamine, monobutylamine, dibutylamine, tributylamine, etc.), alkanolamines (monoethanolamine, diethanolamine, triethanolamine, etc.), ethylene diamine and polyethylene polyamines (diethylene triamine, triethylene tetramine, etc.), polyoxyalkylene alkylamines (polyoxyethylene laurylamine, polyoxylene tallowamine, polyoxyethylene stearylamine, polyoxyethylene oleylamine, polyoxyethylene tallow propylene diamine and polyoxyethylene stearyl propylene diamine, etc.); and salts of metals in the first group of the periodic system (lithium, sodium, potassium, etc.), second group of the periodic system (magnesium, calcium, zinc, etc.), third group of the periodic system (aluminum, etc.), and eighth group of the periodic system (ferrous, cobalt, nickel, etc.) Of these alkalis, ammonium, monoethanolamine, diethanolamine and triethanolamine, as well as lithium, sodium, potassium, magnesium, calcium and zinc salts are preferred. These alkalis can be used alone or in any combination.

The cumulative volume-average particle size of the copolymer (50 percent volume-average particle size measured on a laser-diffraction type particle-size distribution measuring machine) should be normally 1 to 50,000 nm, or preferably 1 to 10,000 nm, or at best 5 to 5,000 nm. If the cumulative volume-average particle size is less than 1 nm, the manifested slippage will decrease. On the other hand, if cumulative volume-average particle size exceeds 50,000 nm, not only the smoothness of the printing paper will decrease, but the manifested slippage per unit weight of slippage-agent added will also decrease. This is not desirable.

The shape of the copolymer particle is not specified, and slippage will manifest as long as copolymer particles exist on the paper surface. Examples of particle shapes include spherical, fusiform, bar-like, angular, columnar, needle-like, platy and amorphous. Among these, spherical and amorphous particles are preferred.

The number-average molecular weight of the copolymer should be normally 500 to 50,000, or preferably 800 to 30,000, or at best 1,000 to 20,000. If the number-average molecular weight is less than 500 or exceeds 50,000, the manifested slippage will decrease. This is not desirable.

The coating weight of the slipping property imparting agent provided by the present invention can be increased or decreased as necessary in accordance with the purpose of application. However, generally a coating weight of 0.001 to 1 $g/m^2$ by solid content is preferred.

The copolymer used in the slipping property imparting agent proposed by the present invention is applied in a water-based dispersion. The solid content concentration of the copolymer in the water-based dispersion should be normally 1 to 80 mass percent, or preferably 5 to 60 mass percent, or at best 10 to 50 mass percent. If the concentration of the copolymer is less than 1 mass percent, a large amount must be added to the coating solution to achieve sufficient slippage. On the other hand, if the concentration of the copolymer exceeds 80 mass percent, the viscosity of the dispersion will increase and the dispersion will become difficult to handle.

A water-based dispersion of the neutralized salt of the copolymer can be easily produced by any of the following methods: [1] place water, the copolymer and alkalis into a reaction container, heat the mixture to the melting point of the copolymer or above, emulsify and disperse the copolymer using an agitating mixer or disperser, and then let the obtained dispersion cool; [2] add water or hot water into a fused mixture of the copolymer and alkalis under agitation, emulsify and disperse the copolymer using an agitating mixer or disperser, and then let the obtained dispersion cool; [3] introduce a fused mixture of the copolymer and alkalis under agitation into a water heated to the melting point of the copolymer or above, emulsify and disperse the copolymer using an agitating mixer or disperser, and then let the obtained dispersion cool; and [4] add water under agitation to a high-concentration (60 percent or more) water-based dispersion of a fused mixture containing the copolymer and alkalis, and then let the diluted dispersion cool. However, the production method is not limited to the above, and the water-based dispersion may be obtained using any emulsifying method and/or dispersion method.

The agitating mixer may be a propeller-type agitator, dissolver, homo-mixer, ball mill, sand mill, supersonic disperser, kneader, line mixer, or the like.

The disperser may be a propeller-type agitator, piston-type high-pressure emulsifier, homo-mixer, supersonic emulsifying disperser, pressure-nozzle type emulsifier, high-speed/high-shear rotary type agitating disperser or colloid mill. It may also be a media-type disperser that uses various medias such as glass beads and steel balls to crush and disperse the target substance, such as a sand grinder, agitator mill, ball mill or atritor. Two or more of these dispersers can be combined, or an agitating mixer may also be used in conjunction.

Surface active agents and/or water-soluble polymers may be used, so that the cumulative average particle size or viscosity will not change significantly even when the water-based dispersion of the neutralized salt of the copolymer is stored for a long period.

Examples of surface active agents include the following: sorbitan fatty acid ester, glycerin fatty acid ester, polyoxyethylene castor oil fatty acid ester, polyoxyethylene hardened castor oil fatty acid ester, diglycerin fatty acid ester, sucrose fatty acid ester, polyglycerin fatty acid ester, polyglycerin condensed ricinoleic acid ester, polyether modified silicone, polyoxyethylene sorbitan fatty acid ester, polyoxyethylene sorbit fatty acid ester, polyoxyethylene glycerin fatty acid ester, polyoxyethylene alkyl ether, polyoxyethylene propylene alkyl ether, polyoxyethylene alkyl phenyl ether, polyoxyethylene propylene alkyl phenyl ether, polyoxyethylene castor oil ether, polyoxyethylene hardened castor oil ether, polyoxyethylene alkylamine, polyoxyethylene fatty acid amide, polyoxyethylene alkyl sulfuric ester salt, higher alcohol sulfuric ester salt, alkyl ether sulfuric ester salt, sulfated oil, sulfated fatty acid ester, sulfated olefin, alkyl benzene sulfonate, α-olefin sulfonate, alkyl sulfosuccinate, partial ester salt of polyoxyethylene alkyl ether/sulfosuccinate, polyoxyethylene alkyl phenyl ether (polyoxyethylene octyl phenyl ether, polyoxyethylene nonyl phenyl ether, etc.), polyoxyethylene alkyl ether (polyoxyethylene stearyl ether, polyoxyethylene grade 2 tridecyl ether, etc.), polyoxyethylene glycol fatty acid ester (polyoxyethylene glycol lauric acid ester, polyoxyethylene glycol oleic acid ester, etc.), fatty acid alkanolamide (lauric acid diethanolamide, stearic acid monoethanolamide, etc.)

Examples of salts include complete or partial salts of the following: ammonia; amine compounds such as alkylamines (monoethylamine, monobutylamine, triethylamine, etc.) and alkanolamines (monoethanolamine, diethanolamine, triethanolamine, etc.); and metals in the first group of the periodic system (lithium, sodium, potassium, etc.) or second group of the periodic system (magnesium, calcium, zinc, etc.).

Examples of water-soluble polymers include the following: cellulose, pullulan, sodium alginate, Arabian gum, guar gum, carageenan, gelatin, curdlan, agar, starch, hyaluronic acid, scleroglucan, schizophyllan, lentinan, paramylon, callose, laminaran, glucomannan, arabinogalactan, xanthan gum, welan gum, rhamsan gum, tragacanth gum, carob gum, locust bean gum, pectin, quince seed, algae colloid, glycyrrhetinic acid, dextran, collagen, casein, albumin, agarose, glycogen, methylcellulose, ethylcellulose, nitrocellulose, carboxymethylcellulose, hydroxyethylcellulose, hydroxypropylcellulose, hydroxypropylmethylcellulose, hydroxyethylmethylcellulose, cellulose sodium sulfate, carboxymethylethylcellulose, propylene glycol alginate ester, polyvinyl pyrolidone, carboxymethyl starch, methylhydroxypropyl starch, cellulose acetate phthalate, polyvinyl alcohol, polyethylene oxide, polyoxyethylene propylene copolymer, polyacrylamide, polymethacrylamide, polyacrylic acid, polyacrylate, polymethacrylic acid, polymethacrylate, polystyrene sulfonic acid, polystyrene sulfonate, naphthalenesulfonic formalin condensate, naphthalenesulfonic formalin condensate salt, acrylamide and acrylate copolymer, acrylamide and methacrylate copolymer, methacrylamide and acrylamide copolymer, methacrylamide and methacrylic acid copolymer, methacrylamide and methacrylate copolymer, acrylic acid and maleic acid copolymer, acrylate and maleate copolymer, styrene and maleic acid copolymer, and styrene and maleate copolymer.

Examples of salts include complete or partial salts of the following: ammonia; amine compounds such as alkylamines (monoethylamine, monobutylamine, triethylamine, etc.) and alkanolamines (monoethanolamine, diethanolamine, triethanolamine, etc.); and metals in the first group of the periodic system (lithium, sodium, potassium, etc.) or second group of the periodic system (magnesium, calcium, zinc, etc.).

The blending ratio of surface active agents and/or water-soluble polymers should be normally 0 to 50 parts by mass, or preferably 0 to 30 parts by mass, or at best 0 to 20 parts by mass, to 100 parts by mass of the neutralized salt of the copolymer. If the ratio of surface active agents and/or water-soluble polymers exceeds 50 parts by mass, the coating solution will generate more foams, thereby affecting the printing line. Water resistance of the printing paper will also drop.

The water-based dispersion of the neutralized salt of the copolymer used in the present invention may contain antioxidants, UV absorbents, waterproofing agents, antistatic agents, weather stabilizers, fouling inhibitors, dispersants, antiseptic agents, disinfectants, antifoamers, slipping property imparting agents, antiblocking agents, viscosity enhancers, water-retaining agents, aromatic chemicals, dyes and pigments.

As for the pulps used in the production of a paper or paperboard on which to apply the slipping property imparting agent for paper as proposed by the present invention, any of the following may be used: bleached or unbleached chemical pulps such as kraft pulp and sulfite pulp; groundwood pulps; bleached or unbleached high-yield pulps such as mechanical pulp and thermo-mechanical pulp; and wastepaper pulps such as waste newspaper, waste magazine paper, waste corrugated cardboard and deinked waste paper. The paper or paperboard before being coated with the slipping property imparting agent for paper as proposed by the present invention may use any of the following additives to manifest the properties required of each paper type: fillers; dyes; sizing agents such as rosin-based sizing agent for acid paper, sizing agent for neutral paper based on alkylketene dimmer or alkenyl succinic anhydride, and rosin-based sizing agent for neutral paper; dry paper-strengthening agents; wet paper-strengthening agents; retention-improving agents, drainage-improving agents, and antifoamers. As for fillers, any one or more of clay, talc, titanium oxide, heavy calcium carbonate and precipitated calcium carbonate may be used.

The coating machine used to apply a clear coat containing the slipping property imparting agent for paper as proposed by the present invention may be a sizing press, film press, gate-roll coater, symsizer, blade coater, calender, bar coater, knife coater, air-knife coater, curtain coater, or the like.

It is also possible to use a spray coating machine to apply the clear coat on the base paper surface.

The slipping property imparting agent for paper as proposed by the present invention may be applied by itself, or as a coating solution mixing the slipping property imparting agent with any of the following: starches such as oxidized starch, phosphate esterified starch, custom-made modified starch and cationic starch; celluloses such as carboxylic methylcellulose; and water-soluble polymers such as polyvinyl alcohol, polyacrylamide and sodium alginate. It is also possible to use one or more of other additives including surface-sizing agents, antislippage agents, preservatives, rustproofing agents, antifoamers, viscosity-adjusting agents, dyes and pigments.

Various papers and paperboard can be coated with the slipping property imparting agent for clear coat as proposed by the present invention. For example, these include: recording papers such as PPC paper, inkjet paper, laser printer paper, form paper, thermal transfer paper and thermo-sensitive recording paper; coated papers such as art paper, cast coated paper and woodfree coated paper; packaging papers such as kraft paper and pure-white roll paper; other papers such as notepad paper, paper for making books, printing paper and newsprint paper; paperboards for making paper containers such as manila board paper, white paperboard and chip board paper; and other paperboards such as liner. The slipping property imparting agent proposed by the present invention manifests sufficient slippage when applied on a paper or paperboard, while also adding a sizing property to such paper or paperboard.

[Operation]

All of the conventional slipping property imparting agents for paper consisting of higher fatty-acid metal salt, higher fatty-acid amide, wax emulsion, polyethylene glycol, polyethylene glycol ester, liquid hydrocarbon oil emulsion, polyethylene dispersion and sulfurized fatty oil have their slipping property imparting particles stabilized by surface active agents and/or water-soluble polymers that are adsorbed to the slipping property imparting particles. Therefore, the pH levels of these agents are low, and in an environment of high shearing load the collision among slipping property imparting particles causes the surface active agents and/or water-soluble polymers to separate, thereby allowing the slipping property imparting particles to agglutinate and produce scum.

On the other hand, the neutralized salt of the copolymer proposed by the present invention has its anion groups covalent-bonded with the polymer chains. Therefore, despite its low pH level, the slipping property imparting agent maintains excellent dispersion stability even in an environment of high shearing load and therefore suppresses scum production. Although the manifested slippage will decrease when the ratio of unsaturated carboxylic acid (carboxylate) (b) increases, if the ratio is kept to 50 mol percent of the copolymer composition or less the drop in manifested slippage will be kept to a minimum and the friction coefficient can be reduced efficiently.

EXAMPLES

The following explains the present invention in details using examples. Note that the present invention is not limited to these examples. Unless otherwise specified, the part(s) used in the examples, test methods, etc., refers to part(s) by mass.

(1) Preparation of Slipping Property Imparting Agents

Production Example 1

All of the following constituents were placed in an autoclave and agitated using a propeller-type agitator (temperature: 150° C., period: 3 hours). The obtained mixture was further processed on a high-pressure homogenizer (pressure: 1,500 kg/cm$^2$) and then cooled to 25° C.

The cumulative volume-average particle size of the obtained slipping property imparting agent (A) was 60 nm.

| | |
|---|---|
| Copolymer (Ethylene/acrylic acid = 90/10 [mol percent]) | 25.00 parts by mass |
| Potassium hydroxide | 0.03 part by mass |
| Water | 74.97 parts by mass |
| Total | 100.00 parts by mass |

Production Example 2

All of the following constituents were placed in an autoclave and agitated using a propeller-type agitator (temperature: 150° C., period: 3 hours). The obtained mixture was further processed on a high-pressure homogenizer (pressure: 100 kg/cm²) and then cooled to 25° C.

The cumulative volume-average particle size of the obtained slipping property imparting agent (B) was 10,000 nm.

| | |
|---|---|
| Copolymer (Ethylene/acrylic acid = 80/20 [mol percent]) | 20.00 parts by mass |
| Ammonia water (25 mass percent) | 1.09 parts by mass |
| Water | 78.91 parts by mass |
| Total | 100.00 parts by mass |

Production Example 3

All of the following constituents were placed in an autoclave and agitated using a propeller-type agitator (temperature: 140° C., period: 3 hours). The obtained mixture was further processed on a high-pressure homogenizer (pressure: 500 kg/cm²) and then cooled to 25° C.

The cumulative volume-average particle size of the obtained slipping property imparting agent (C) was 3,000 nm.

| | |
|---|---|
| Copolymer (Ethylene/potassium acrylate = 95/5 [mol percent]) | 40.00 parts by mass |
| Water | 60.00 parts by mass |
| Total | 100.00 parts by mass |

Production Example 4

All of the following constituents were placed in an autoclave and agitated using a propeller-type agitator (temperature: 150° C., period: 3 hours). The obtained mixture was further processed on a high-pressure homogenizer (pressure: 700 kg/cm²) and then cooled to 25° C.

The cumulative volume-average particle size of the obtained slipping property imparting agent (D) was 15 nm.

| | |
|---|---|
| Copolymer (Ethylene/methacrylic acid = 90/10 [mol percent]) | 25.00 parts by mass |
| Sodium hydroxide | 0.03 part by mass |
| Water | 74.97 parts by mass |
| Total | 100.00 parts by mass |

Production Example 5

All of the following constituents were placed in an autoclave and agitated using a propeller-type agitator (temperature: 140° C., period: 3 hours). The obtained mixture was further processed on a high-pressure homogenizer (pressure: 100 kg/cm²) and then cooled to 25° C.

The cumulative volume-average particle size of the obtained slipping property imparting agent (E) was 5,000 nm.

| | |
|---|---|
| Copolymer (Ethylene/methacrylic acid/methyl methacrylate = 75/10/15 [mol percent]) | 60.00 parts by mass |
| Potassium hydroxide | 0.02 part by mass |
| Water | 39.98 parts by mass |
| Total | 100.00 parts by mass |

Production Example 6

All of the following constituents were placed in an autoclave and agitated using a propeller-type agitator (temperature: 140° C., period: 3 hours). The obtained mixture was slowly cooled to 25° C.

The cumulative volume-average particle size of the obtained slipping property imparting agent (F) was 45,000 nm.

| | |
|---|---|
| Copolymer (Styrene/maleic acid = 55/45 [mol percent]) | 20.00 parts by mass |
| Diethanolamine | 0.004 part by mass |
| Water | 79.996 parts by mass |
| Total | 100.00 parts by mass |

Comparative Production Example 1

All of the following constituents were placed in an autoclave and agitated using a propeller-type agitator (temperature: 140° C., period: 3 hours). The obtained mixture was further processed on a high-pressure homogenizer (pressure: 1,000 kg/cm²) and then cooled to 25° C.

The cumulative volume-average particle size of the obtained slipping property imparting agent (G) was 40 nm.

| | |
|---|---|
| Copolymer (Ethylene/acrylic acid = 99.5/0.5 [mol percent]) | 30.00 parts by mass |
| Potassium hydroxide | 0.002 part by mass |
| Water | 69.998 parts by mass |
| Total | 100.00 parts by mass |

Comparative Production Example 2

All of the following constituents were placed in an autoclave and agitated using a propeller-type agitator (temperature: 140° C., period: 3 hours). The obtained mixture was slowly cooled to 25° C.

The cumulative volume-average particle size of the obtained slipping property imparting agent (H) was 80,000 nm.

| | |
|---|---|
| Copolymer (Ethylene/methacrylic acid/methyl methacrylate = 40/35/25 [mol percent]) | 50.000 parts by mass |
| Sodium hydroxide | 0.006 part by mass |
| Water | 49.994 parts by mass |
| Total | 100.00 parts by mass |

Comparative Production Example 3

All of the following constituents were placed in an autoclave and agitated using a propeller-type agitator (temperature: 140° C., period: 3 hours). The obtained mixture was further processed on a high-pressure homogenizer (pressure: 200 kg/cm$^2$) and then cooled to 25° C.

The cumulative volume-average particle size of the obtained slipping property imparting agent (I) was 5,000 nm.

| | |
|---|---|
| Copolymer (Ethylene/methacrylic acid = 90/10 [mol percent]) | 75.00 parts by mass |
| Ammonia water (25 mass percent) | 6.80 parts by mass |
| Water | 18.20 parts by mass |
| Total | 100.00 parts by mass |

Comparative Production Example 4

All of the following constituents were placed in an autoclave and agitated using a propeller-type agitator (temperature: 180° C., period: 3 hours). The obtained mixture was further processed on a high-pressure homogenizer (pressure: 700 kg/cm$^2$) and then cooled to 25° C.

The cumulative volume-average particle size of the obtained slipping property imparting agent (J) was 30 nm.

| | |
|---|---|
| Oxidized polyethylene wax (Acid value: 18 mgKOH/g) | 32.0 parts by mass |
| Potassium hydroxide | 5.1 parts by mass |
| Polyoxyethylene (added by 11 mols) dodecyl alkyl ether | 8.0 parts by mass |
| Water | 54.9 parts by mass |
| Total | 100.0 parts by mass |

Comparative Production Example 5

All of the following constituents were placed in an autoclave and agitated using a propeller-type agitator (temperature: 180° C., period: 3 hours). The obtained mixture was further processed on a high-pressure homogenizer (pressure: 700 kg/cm$^2$) and then cooled to 25° C.

The cumulative volume-average particle size of the obtained slipping property imparting agent (K) was 30 nm.

| | |
|---|---|
| Oxidized polyethylene wax (Acid value: 18 mgKOH/g) | 28.8 parts by mass |
| Potassium hydroxide | 4.6 parts by mass |
| Polyoxyethylene (added by 11 mols) dodecyl alkyl ether | 7.2 parts by mass |
| SN Defoamer 171 (antifoamer manufactured by SAN NOPCO) | 10.0 parts by mass |
| Water | 49.4 parts by mass |
| Total | 100.0 parts by mass |

Comparative Production Example 6

All of the following constituents were placed in an autoclave and agitated using a propeller-type agitator (temperature: 180° C., period: 3 hours). The obtained mixture was further processed on a high-pressure homogenizer (pressure: 700 kg/cm$^2$) and then cooled to 25° C.

The cumulative volume-average particle size of the obtained slipping property imparting agent (L) was 20 nm.

| | |
|---|---|
| Oxidized polyethylene wax (Acid value: 18 mgKOH/g) | 32.0 parts by mass |
| Potassium hydroxide | 4.6 parts by mass |
| Polyoxyethylene (added by 4 mols) stearyl amino ether | 4.0 parts by mass |
| Polyoxyethylene (added by 11 mols) dodecyl alkyl ether | 8.0 parts by mass |
| Water | 51.4 parts by mass |
| Total | 100.0 parts by mass |

The number-average molecular weights, cumulative volume-average particle sizes, neutralized salts and neutralization levels of the slipping property imparting agents obtained by Production Examples 1 through 6 and Comparative Production Examples 1 through 6 are shown in Table 1.

[Measurement of Cumulative Volume-Average Particle Size]

The cumulative volume-average particle sizes of slipping property imparting agents were measured using a laser-diffraction type particle-size analyzer [Micro Track Particle-Size Analyzer, manufactured by Nikkiso].

TABLE 1

| | | Copolymer (I) | | | Number-average molecular Weight | Cumulative volume-average particle size [nm] | Neutralized salt | Alkali content [mol equivalent] |
|---|---|---|---|---|---|---|---|---|
| Slippage-adding agent | | Olefin (a) [mol %] | Unsaturated carboxylate (b) [mol %] | Monomer (c) [mol %] | | | | |
| Examples | A | Ethylene (90.0) | Acrylic acid (10.0) | — | 3000 | 60 | Potassium | 60 |
| | B | Ethylene (80.0) | Acrylic acid (20.0) | — | 700 | 10000 | Ammonium | 280 |
| | C | Ethylene (95.0) | Acrylic acid (5.0) | — | 48000 | 3000 | Potassium | 90 |
| | D | Ethylene (90.0) | Methacrylic acid (10.0) | — | 2500 | 15 | Sodium | 60 |
| | E | Ethylene (75.0) | Methacrylic acid (10.0) | Methyl methacrylate (15.0) | 20000 | 5000 | Potassium | 100 |
| | F | Styrene (55.0) | Maleic acid (45.0) | — | 25000 | 45000 | Diethanolamine | 10 |
| Comparative examples | G | Ethylene (99.5) | Acrylic acid (0.5) | — | 3000 | 40 | Potassium | 95 |
| | H | Ethylene (40.0) | Acrylic acid (35.0) | Methyl methacrylate (25.0) | 70000 | 80000 | Sodium | 60 |
| | I | Ethylene (90.0) | Methacrylic acid (10.0) | — | 300 | 5000 | Ammonium | 400 |
| | J | Oxidized polyethylene (acid value: 18 mgKOH/g) | | | 2000 | 30 | Potassium | 90 |
| | K | Oxidized polyethylene (acid value: 18 mgKOH/g), containing 10 mass % of antifoamer | | | 2000 | 30 | Potassium | 90 |
| | L | Oxidized polyethylene (acid value: 18 mgKOH/g) | | | 2000 | 20 | Potassium polyoxyethylene stearyl amino ether | 90 |
| | M | Calcium stearate (NOPCOAT C-104-HS, manufactured by SAN NOPCO) | | | — | 5000 | — | — |

Example 1

Twelve parts of softwood kraft pulp, 22 parts of thermo-mechanical pulp and 66 parts of deinked waste-paper pulp were mixed and then defiberized by a refiner to prepare a pulp slurry (paper material) with a freeness of 110 ml (CSF/Canada Standard Freeness). The obtained pulp slurry was mixed with a filler consisting of 2 percent of white carbon relative to the absolute dry weight of pulp, and then processed on a twin-wire papermaking machine to obtain a base newsprint paper with a basis weight of 42 g/m$^2$.

Next, the paper was coated with oxidized starch to a coating weight of 0.5 g/m$^2$, and slipping property imparting agent A to a coating weight of 0.0031 g/m$^2$ (per both sides), respectively, using a gate-roll coater operated at a coating speed of 1,300 m/min, after which the coated paper was calendered to obtain an offset newsprint paper.

Example 2

An offset newsprint paper was obtained under the same condition as described in Example 1, except that slipping property imparting agent A was applied to a coating weight of 0.0044 g/m$^2$ (per both sides).

Example 3

An offset newsprint paper was obtained under the same condition as described in Example 1, except that slipping property imparting agent D was applied to a coating weight of 0.0035 g/m$^2$ (per both sides).

Example 4

An offset newsprint paper was obtained under the same condition as described in Example 1, except that slipping property imparting agent D was applied to a coating weight of 0.0049 g/m$^2$ (per both sides).

Comparative Example 1

An offset newsprint paper was obtained under the same condition as described in Example 1, except that slipping property imparting agent was not applied.

Comparative Example 2

An offset newsprint paper was obtained under the same condition as described in Example 1, except that slipping property imparting agent J was applied to a coating weight of 0.0045 g/m$^2$ (per both sides).

Comparative Example 3

An offset newsprint paper was obtained under the same condition as described in Example 1, except that slipping property imparting agent K was applied to a coating weight of 0.0043 g/m$^2$ (per both sides).

Comparative Example 4

An offset newsprint paper was obtained under the same condition as described in Example 1, except that slipping property imparting agent L was applied to a coating weight of 0.0044 g/m² (per both sides).

Example 5

An offset newsprint paper was obtained under the same condition as described in Example 1, except that the starch was applied to a coating weight of 0.3 g/m² (per both sides), slipping property imparting agent A to 0.0050 g/m² (per both sides), and surface-sizing agent (KN-520, manufactured by Harima Chemicals) to 0.06 g/m² (per both sides), respectively.

Example 6

An offset newsprint paper was obtained under the same condition as described in Example 5, except that slipping property imparting agent A was applied to a coating weight of 0.0091 g/m² (per both sides).

Comparative Example 5

An offset newsprint paper was obtained under the same condition as described in Example 5, except that slipping property imparting agent was not applied.

The offset newspaper print papers obtained in Examples 1 through 6 and Comparative Examples 1 through 5 were measured for the items specified below.

The results are shown in Table 2.

Scum generation rate: Five kilograms of the coating solution was let stand for 4 hours, after which it was filtered through a 42-mesh wire net and the absolute dry weight of filtered residue was measured. The scum generation rate was obtained as the percentage of the measured absolute dry weight of filtered residue to the total weight of solid content in the coating solution.

Static friction coefficient and dynamic friction coefficient: Measurement was taken in accordance with JIS P 8147. In general, friction coefficients of less than 0.6 do not pose any problem for offset newsprint papers.

Measurement of tackiness: Two pieces, each of 4×6 cm in size, were cut out from the offset newsprint paper. The cutout paper pieces were soaked in 20° C. waster for 5 seconds, and then adhered together with the coated surfaces contacting each other. The adhered paper pieces were sandwiched between base newsprint papers, processed through rolls under a pressure of 50 kg/m², and then left in a temperature of 25° C. and relative humidity of 60 percent for 24 hours to adjust the moisture content. Thereafter, a test piece of 3×6 cm in size was prepared from the processed paper sample, and the tackiness of the test piece was measured on a tensile tester at a pulling speed of 30 mm/min. In general, the larger the measured value, the less likely the paper separates (i.e., its adhesion is stronger).

For the offset newsprint papers obtained per the present invention, those showing a tackiness of 500 mN/3 cm or less were rated as offering "good separability."

TABLE 2

|  | Scum generation rate (%) | Static friction coefficient | Dynamic friction coefficient | Tackiness (mN/3 cm) |
| --- | --- | --- | --- | --- |
| Example 1 | 0 | 0.59 | 0.57 | 196 |
| Example 2 | 0 | 0.57 | 0.55 | 147 |
| Example 3 | 0 | 0.59 | 0.57 | 196 |
| Example 4 | 0 | 0.57 | 0.55 | 147 |
| Example 5 | 0 | 0.56 | 0.51 | 400 |
| Example 6 | 0 | 0.52 | 0.48 | 380 |
| Comparative example 1 | 0 | 0.60 | 0.58 | 343 |
| Comparative example 2 | 1.5 | 0.44 | 0.42 | 147 |
| Comparative example 3 | 2.1 | 0.42 | 0.42 | 157 |
| Comparative example 4 | 1.8 | 0.43 | 0.42 | 137 |
| Comparative example 5 | 0 | 0.59 | 0.54 | 441 |

As shown in Table 2, the slipping property imparting agents for clear coat as prepared per the present invention produced no scum, provided good coatability, and exhibited no undesirable tackiness. On the other hand, the slipping property imparting agents for clear coat as obtained in Comparative Examples 2 through 4 produced scum and exhibited poor coatability.

INDUSTRIAL FIELD OF APPLICATION

While the conventional slipping property imparting agents for clear coat produce scum and exhibit poor coatability, the slipping property imparting agent for clear coat as proposed by the present invention produces no scum, offers good coatability, and exhibits no undesirable tackiness. The slipping property imparting agent for clear coat as proposed by the present invention manifests sufficient slippage and also adds a sizing property when coated on: recording papers such as PPC paper, inkjet paper, laser printer paper, form paper, thermal transfer paper and thermosensitive recording paper; coated papers such as art paper, cast coated paper and woodfree coated paper; packaging papers such as kraft paper and pure-white roll paper; other papers such as notepad paper, paper for making books, printing paper and newsprint paper; paperboards for making paper containers such as manila board paper, white paperboard and chip board paper; and other paperboards such as liner.

What is claimed is:

1. A clear coated paper comprising a base paper coated with a slipping property imparting agent for clear coat, said slipping property imparting agent comprising:
   (i) a copolymer whose constituents are unsaturated olefin (constituent (a)) and unsaturated carboxylic acid (carboxylate) (constituent (b)), and
   (ii) a starch, a cellulose, a polyvinyl alcohol, a polyacrylamide, or sodium alginate,
   wherein said copolymer contains 50 to 99 mol percent of constituent (a) and 50 to 1 mol percent of constituent (b) to the total mol number of constituents (a) and (b) combined, wherein the copolymer has a number-average molecular weight is 500-50,000,
   wherein said slipping property imparting agent is a clear coat applied in an amount of 0.001 g/m² to 0.0091 g/m² by solid content per both sides and has a pH value of less than 7.

2. The clear coated paper as described in claim 1, wherein said copolymer contains 0.05 to 3 mol equivalent of alkalis per 1 mol equivalent of carboxyl groups.

3. The clear coated paper as described in claim 2, wherein a cumulative volume-average particle size of said copolymer is 1 to 50,000 nm.

4. The clear coated paper as described in claim 1, wherein a cumulative volume-average particle size of said copolymer is 1 to 50,000 nm.

5. The clear coated paper as described in claim 1, wherein the clear coat is an outermost layer.

6. The clear coated paper as described in claim 1, wherein the copolymer contains 60 to 98 mol percent of constituent (a) and 40 to 2 mol percent of constituent (b) to the total mol number of constituents (a) and (b) combined.

7. The clear coated paper as described in claim 1, wherein the unsaturated olefin (constituent (a)) is selected from the group consisting of olefin derivatives, styrene derivatives, and diene derivatives.

8. The clear coated paper as described in claim 1, wherein both sides of the base paper are coated with the slipping property imparting agent.

9. The clear coated paper as described in claim 1, wherein the unsaturated carboxylic acid (carboxylate) (constituent (b)) is selected from the group consisting of acrylic acid derivatives, methacrylic acid derivatives, maleic anhydride derivatives, maleic acid derivatives, partial esterified compounds, dicarboxylic acids, and partially or completely neutralized salts thereof.

10. The clear coated paper as described in claim 9, wherein the unsaturated carboxylic acid (carboxylate) (constituent (b)) is selected from the group consisting of acrylic acid, methacrylic acid, maleic acid and maleic anhydride or their partially or completely neutralized salts.

11. The clear coated paper as described in claim 1, wherein said copolymer further contains a constituent (constituent (c)) which can be copolymerized with the unsaturated olefin (constituent (a)) and the unsaturated carboxylic acid (carboxylate) (constituent (b)), by up to 20 mol percent of the total mol number of constituents (a) and (b) combined.

12. The clear coated paper as described in claim 11, wherein said copolymer contains 0.05 to 3 mol equivalent of alkalis per 1 mol equivalent of carboxyl groups.

13. The clear coated paper as described in claim 11, wherein constituent (c) is selected from the group consisting of vinyl esters, unsaturated alkyl ester carboxylates, polyoxyalkylenes, alkoxypolyalkylene glycol ester acrylates, polyoxyalkylene monovinyl ethers, alkoxyalkylene glycol mononvinyl ethers, polyoxyalkylene aryl ethers, alcoxypolyalkylene glycol aryl ethers, hydroxyl alkyl acrylates, and amide compounds.

14. The clear coated paper as described in claim 11, wherein constituent (c) is selected from the group consisting of, dimethyl aminomethyl acrylate, dimethyl aminoethyl acrylate, diethyl aminomethyl acrylate, diethyl aminoethyl acrylate, dimethyl aminomethyl methacrylate, dimethyl aminoethyl methacrylate, diethyl aminomethyl methacrylate, diethyl aminoethyl methacrylate, vinyl chloride, benzil acrylate, benzil methacrylate, styrene sulfonate, vinyl sulfonate, 2-acrylamide-2-methylpropane sulfonate, and vinyl pyridine.

15. The clear coated paper as described in claim 11, wherein a cumulative volume-average particle size of said copolymer is 1 to 50,000 nm.

* * * * *

UNITED STATES PATENT AND TRADEMARK OFFICE
CERTIFICATE OF CORRECTION

PATENT NO. : 7,348,065 B2  
APPLICATION NO. : 10/509226  
DATED : March 25, 2008  
INVENTOR(S) : Hiroshi Ono et al.

Page 1 of 1

It is certified that error appears in the above-identified patent and that said Letters Patent is hereby corrected as shown below:

At Column 1, Line 5: Below "Title" insert -- RELATED APPLICATION --.

At Column 5, Line 54: Delete "mononvinyl" and insert -- monovinyl --, therefor.

At Column 5, Line 64: Delete "alcoxypolyalkylene," and insert -- alkoxypolyalkylene --, therefor.

At Column 20, Line 15: In Claim 13, delete "mononvinyl" and insert -- monovinyl --, therefor.

At Column 20, Line 15-16: In Claim 13, delete "alcoxypolyalkylene," and insert -- alkoxypolyalkylene --, therefor.

Signed and Sealed this

Eleventh Day of November, 2008

JON W. DUDAS  
*Director of the United States Patent and Trademark Office*